United States Patent [19]

Bullock et al.

[11] Patent Number: 4,595,554

[45] Date of Patent: Jun. 17, 1986

[54] PROCESS FOR THERMOFORMING THERMOPLASTIC SHEET MATERIALS

[75] Inventors: Lance W. Bullock, Wonga Park; Josip Vlahek; Ferenc Kovacs, both of Tullamarine, all of Australia

[73] Assignee: W. R. Grace Australia Limited, Fawkner, Australia

[21] Appl. No.: 669,193

[22] Filed: Nov. 7, 1984

Related U.S. Application Data

[62] Division of Ser. No. 455,618, Jan. 4, 1983, Pat. No. 4,500,277.

[30] Foreign Application Priority Data

Mar. 2, 1982 [AU] Australia ............................... PF2922

[51] Int. Cl.$^4$ ............................................... B29C 51/10
[52] U.S. Cl. ....................................... 264/522; 264/550
[58] Field of Search ......................... 264/522, 549–551; 425/387.1, 388, 398, 403, DIG. 35

[56] References Cited

U.S. PATENT DOCUMENTS

| | | | |
|---|---|---|---|
| 2,292,917 | 8/1942 | Williams | 425/407 |
| 2,985,915 | 5/1961 | Winstead | 264/522 X |
| 2,990,581 | 7/1961 | Rowe | 264/549 |
| 3,256,564 | 6/1966 | Welshon | 264/522 X |
| 3,291,874 | 12/1966 | Negoro | 264/89 |
| 3,342,915 | 9/1967 | Wanderer | 264/522 |
| 3,496,610 | 2/1970 | Shelby et al. | 249/135 |
| 3,509,246 | 4/1970 | Borgardt | 264/522 |
| 3,520,962 | 7/1970 | Schneider | 264/522 |
| 3,521,849 | 7/1970 | Voss | 249/135 |
| 3,527,854 | 9/1970 | Martin et al. | 264/522 |
| 3,529,458 | 9/1970 | Butler et al. | 72/60 |
| 3,612,158 | 10/1971 | Rosal | 164/138 |
| 3,734,449 | 5/1973 | Itou et al. | 249/114 |
| 3,814,784 | 6/1974 | Wolf | 264/327 X |
| 3,901,640 | 8/1975 | Tigner | 425/403 |
| 4,039,271 | 8/1977 | Hudson | 425/529 |
| 4,039,609 | 8/1977 | Thiel et al. | 264/295 X |
| 4,085,177 | 4/1978 | Sauer | 264/89 |
| 4,129,101 | 12/1978 | Townsend | 123/41.56 |
| 4,397,804 | 8/1983 | Medwed | 264/522 X |

Primary Examiner—Jan Silbaugh
Attorney, Agent, or Firm—John J. Toney; William D. Lee, Jr.; Mark B. Quatt

[57] ABSTRACT

The present invention relates to an improved plug or tool for use in the production of shaped articles from thermoplastic sheet materials. An important feature of the present invention is that the tool or plug comprises a body portion which incorporates one or more inserts which possess a thermal conductivity different from the thermal conductivity of the body portion.

4 Claims, 5 Drawing Figures

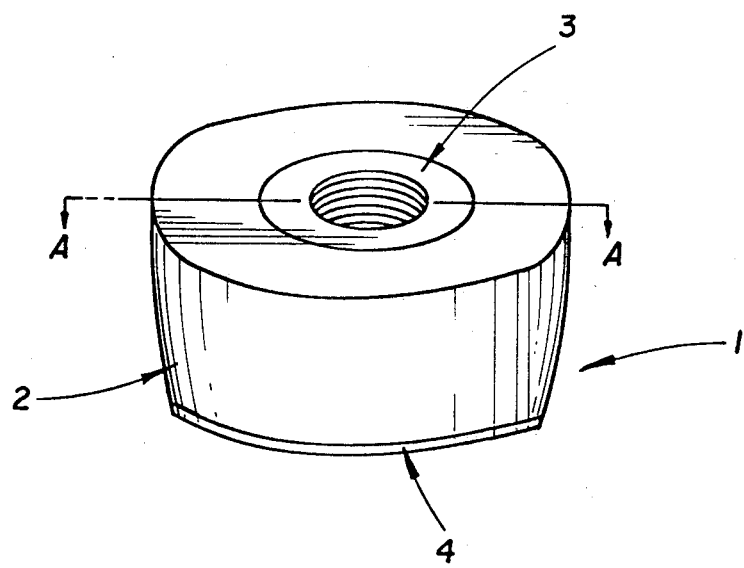
FIG. I
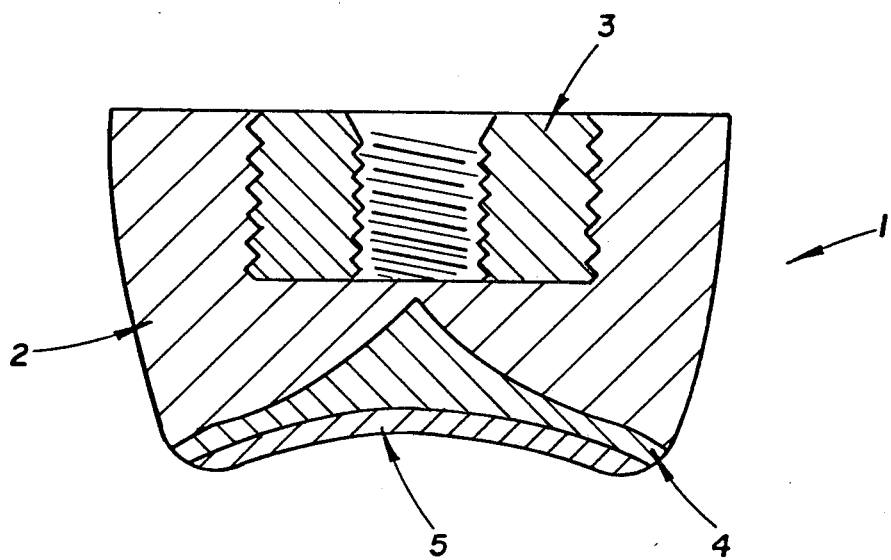
FIG. II

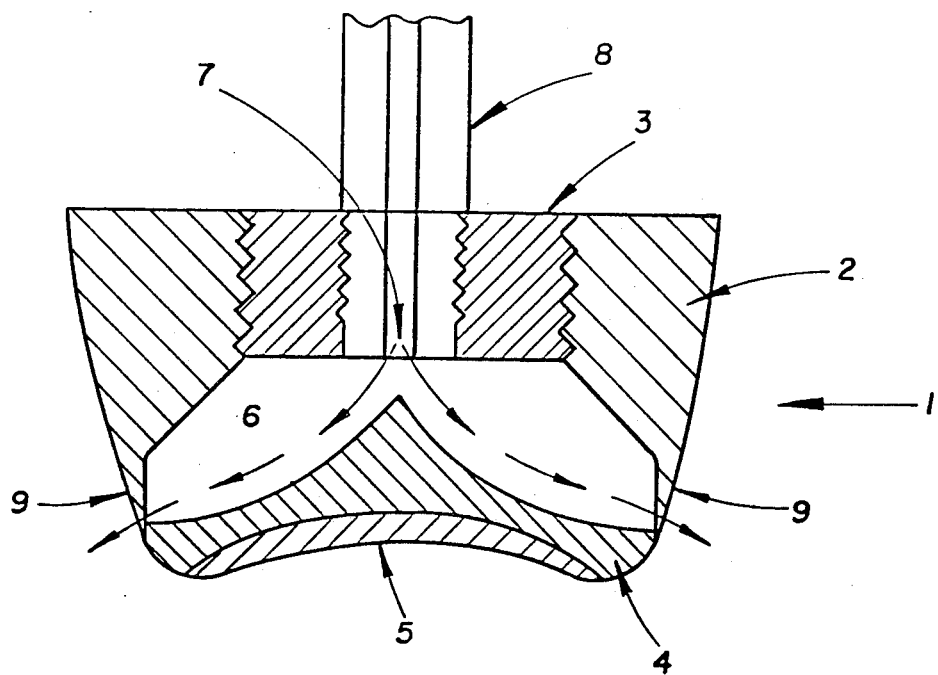
FIG. III
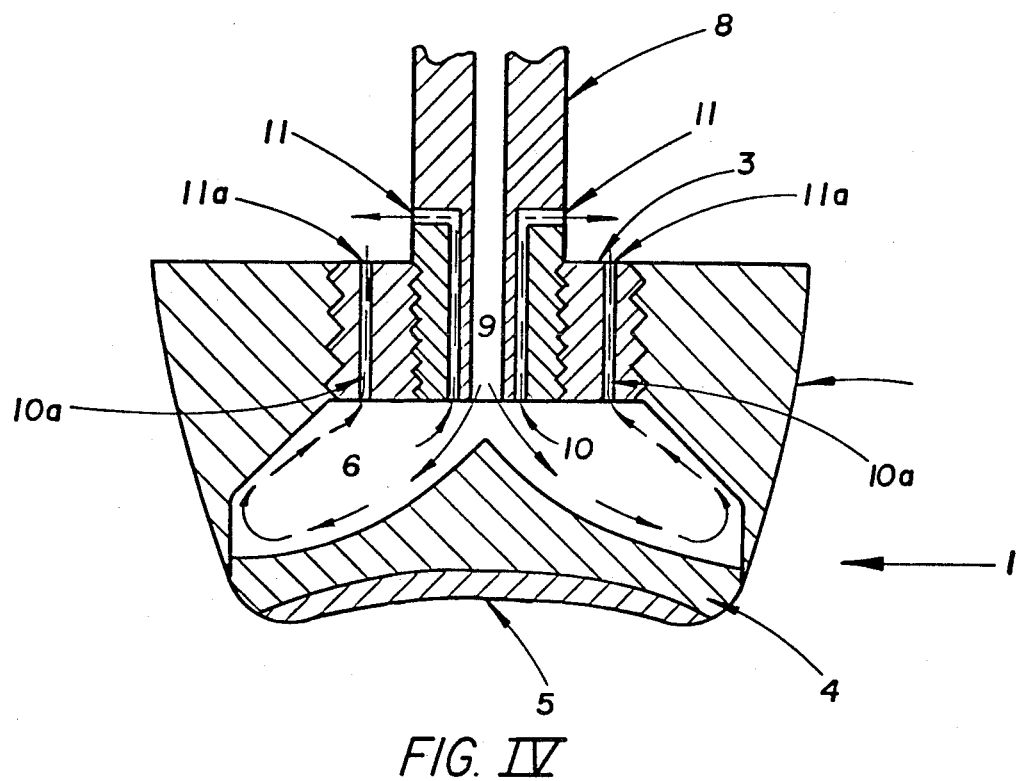
FIG. IV

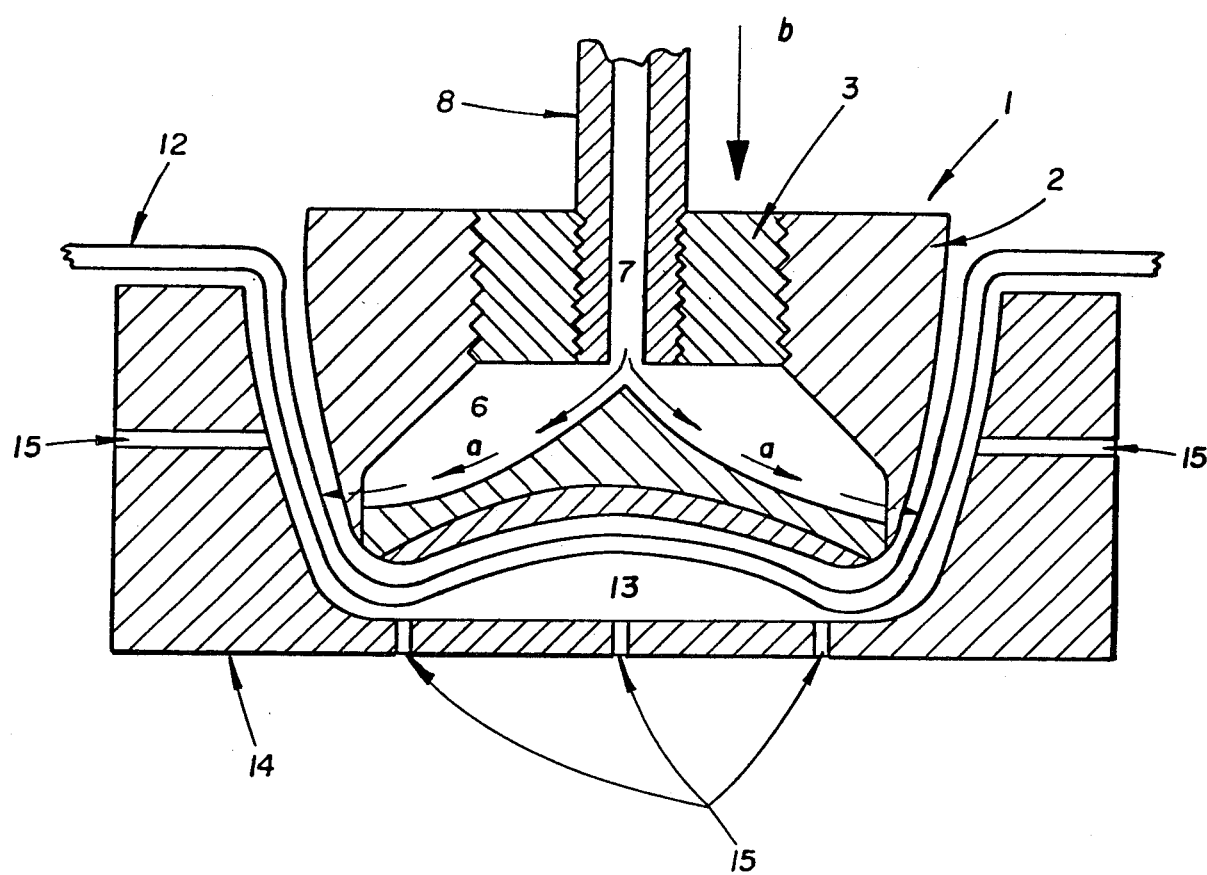
FIG. V

PROCESS FOR THERMOFORMING THERMOPLASTIC SHEET MATERIALS

This is a divisional application of U.S. application Ser. No. 455,618, filed on Jan. 4, 1983, now U.S. Pat. No. 4,500,277.

FIELD OF THE PRESENT INVENTION

The field of the present invention encompasses the production of thin walled, generally concave, hollow articles such as containers for butter, margarine and/or the like by the process of thermoforming. More particularly, the field of the present invention is directed to a plug or tool for use in the thermoforming of shaped articles from thermoplastic sheet materials. The invention is in no way restricted to the formation of any particular article or articles.

BACKGROUND OF THE INVENTION

In general terms the thermoforming process relates to the process of forming a shaped article by stretching a heated thermoplastic sheet material such as, for example, polyethylene or polypropylene into a mold by the use of differential air pressure. In one of its forms thermoforming relates to the formation of a relatively shallow article by the use of vacuum and/or air under pressure to stretch and thus force a preheated thermoplastic sheet material into a forming cavity of a mold. When the shaped article is required to have a greater depth than the beforementioned relatively shallow article, a plug or tool has been utilized to assist in the stretching of the heated thermoplastic sheet material down into the forming cavity of a mold. Thereafter, formation of the article is completed by application of a vacuum and/or air under pressure to force close conformance of the thermoplastic sheet material with the surface of the forming cavity of the mold. The actual size and shape of the plug used is dependent on the size and shape of the article to be manufactured. One objective in using such a plug is to uniformly stretch the thermoplastic sheet material so that consistent thinning of the sheet mateiral occurs and the final shaped article, i.e. product, has a wall cross-section or thickness which is as consistent and even as possible.

In several known methods of forming shaped containers by the use of a thermoforming plug, the geometric design of the plug and the timing of its downward stroke relative to the introduction of forming air and/or application of vacuum have been used in attempting to control the degree of container wall cross-section uniformity and, accordingly, the end use and physical or structural performance of the manufactured container or other article. Plugs utilized in the past have generally been of a solid construction and manufactured from a single material. Examples of plug materials which have been utilized are wood, felt, aluminum, nylon, polyacetyl (Delrin), and filled epoxy. Unfortunately, the presently known designs for thermoforming plugs have been limited in their degree of control over the consistency of the stretching of the heated thermoplastic sheet material and thus the consistency of the thickness of the cross-section of the wall of a product. Thus, their ability to improve the structural performance of a container or other article without a significant weight and therefore cost penalty has also been limited. Simply stated, existing plug designs have been limited in their ability to selectively strengthen, via selectively increased wall thickness, a critical performance area of a container or other article without increasing the thickness of other areas of the article. Thus, in the past, many containers have been much thicker and heavier than required in noncritical areas and have utilized an excessively large amount of raw material since such action was necessary to effect a satisfactory thickness, strength, rigidity or other structural performance characteristic in a critical performance area. By way of example only, the weight distribution of one known plastic container formed by utilizing an existing plug design is lid/stacking ledge 20%, wall section 58% and base 22%. Although the figure of 22% for the base is too high and a figure of 8 to 10% would be adequate for satisfactory performance of the container, such a distribution is, to a large extent, dictated by the use of existing plug designs.

While the use of plugs or tools of the sort discussed above has, to some extent, resulted in a more consistent stretching and thus distribution of the thermoplastic sheet material throughout the whole shaped article, wall thickness and distribution inconsistencies have, for the reasons discussed above, continued. This lack of control over both the distribution of the thermoplastic material to certain key areas of the article and the consistency of the thermoplastic material has become more important in recent years since the cost of thermoplastic raw materials has been increasing faster than other manufacturing costs and the raw material cost now represent the major cost of a light weight, usually one-trip, disposable plastic container. Accordingly, a continuing quest directed to discovering improved methods and apparatus for manufacturing, on a more cost efficient basis, containers of this sort has been underway. The quest has led those skilled in the art down many avenues. For example, one approach is illustrated in U.S. Pat. No. 3,901,640 to Tigner et al. This approach provides an expandable forming plug enabling variable wall thicknesses in the hollow article by control of the expansion of the plug during the forming of the article. Another approach is illustrated in U.S. Pat. No. 2,990,581 to Rowe, Jr. This approach involves the simultaneous mechanical forming of the article by a plug coupled with differential gas pressure drawing by the application of differential gas pressure through a passage in the plug. Yet another approach has combined the use of a novel plug configuration with the application of differential gas pressure through the plug. This latter approach is illustrated in U.S. Pat. No. 4,039,271 to Hudson et al.

OBJECTS OF THE PRESENT INVENTION

It is one object of the present invention to provide a tool or plug for use in thermoforming shaped articles from thermoplastic sheet material which enables independent control of the wall cross-section or thickness and hence strength of various areas of the shaped article by the selective stretching and distribution of the heat softened thermoplastic material to a given area or areas of the article.

It is a further object of the present invention to provide means whereby containers and other shaped articles may be thermoformed in a more cost efficient manner through a selective weight reduction of the article while not penalizing the overall structural performance of the article.

Another object of the present invention is to provide means whereby the material comprising a thermoplastic sheet can be selectively stretched, thinned and distributed to certain areas of the product being manufactured.

Yet another object of the present invention is to provide a thermoforming plug or tool comprising a body portion with an insert having a thermal conductivity different to the thermal conductivity of the body portion.

Still a further object of the present invention is to provide a process for stretching and thermoforming thermoplastic sheet materials whereby the thermoplastic sheet material is stretched, thinned and distributed with a greater degree of control and consistency.

Still further objects and the broad scope of applicability of the present invention will become apparent to those of ordinary skill in the art from the details given hereinafter. However, it should be understood that the following detailed description and specific examples which indicate the presently preferred embodiments of the invention are given by way of illustration only since various changes and modifications within the spirit and scope of the invention will become apparent to those of ordinary skill in the art from this detailed description.

SUMMARY OF THE INVENTION

According to the present invention, there is provided a plug or tool for use in thermoforming shaped articles from thermoplastic sheet materials, comprising a body portion of a predetermined shape, said body portion having incorporated therein at least one plug insert or plug component of a material which has a thermal conductivity different from the thermal conductivity of the remainder of the body portion.

In one embodiment of the present invention the body portion of the plug is constructed of a porous material and is provided with a hollow internal chamber. In this embodiment forming air can enter the hollow internal chamber and then be diffused through the porous material of the body portion. Such action not only assists in controlling the stretching, thinning and distribution of the heat softened thermoplastic sheet material but, additionally, accelerates the transfer of heat from the plug or tool.

BRIEF DESCRIPTION OF THE DRAWINGS

FIG. I is a perspective view of one embodiment of a thermoforming plug in accordance with the present invention.

FIG. II is a cross-sectional view of the plug of FIG. I taken along line A—A of FIG. I.

FIG. III is a cross-sectional view of a second, more preferred, embodiment of a thermoforming plug in accordance with the present invention.

FIG. IV is a cross-sectional view of yet another embodiment of a thermoforming plug in accordance with the present invention.

FIG. V is a cross-sectional view of the inventive process of the present invention.

DETAILED DESCRIPTION OF THE DRAWINGS AND PREFERRED EMBODIMENTS

Turning now to the drawings wherein like reference numerals refer to equivalent structure and, in particular, to FIG. I, where there is shown a thermoforming plug 1 comprising a body portion 2 which, in this embodiment, is shaped for use in the formation of generally frustoconical containers for butter, margarine or like. The body poriton 2 is provided with an internally threaded metal ferrule 3 positioned axially thereof so that the plug 1 may be mounted on a support shaft (not shown). As with existing plug designs, typical materials which can be utilized in the construction of the body portion 2 of plug 1 of this invention include wood, felt, glass, stainless steel, aluminum, epoxy resin, nylon, polyacetyl and brass.

One important feature of the present invention is that the body portion 2 of the plug 1 incorporates one or more inserts or plug components 4 which possess a thermal conductivity different from the thermal conductivity of the body portion 2. Preferably, the inserts or plug components 4 possess a thermal conductivity higher than that of the body portion 2 of the plug 1. The use of insert(s) or plug component(s) 4 having a different thermal conductivity from that of body portion 2, in accordance with the present invention, provides a means whereby the degree and consistency of stretching of a heated thermoplastic sheet material brought into contact with plug 1 may not only be controlled but also varied as between differing portions of a given thermoplastic sheet. Accordingly, the distribution of thermoplastic material to various portions of the cavity of a mold (not shown) can be independently adjusted and controlled. This controlled, consistent distribution results from the fact that those portions of the heated thermoplastic sheet material which are in contact with portions of plug 1 having a high thermal conductivity will be chilled more readily than those portions of the thermoplastic sheet material which come into contact with a portion of plug 1 having a lower degree of thermal conductivity. Since it is generally known that the degree, of stretching and, accordingly, thinning of a thermoplastic sheet material is greater at higher temperatures it can be seen that the present invention provides a means and method whereby the degree of stretching of a thermoplastic sheet material may be selectively varied from one portion or area of a given thermoplastic sheet to another. Those skilled in the art will recognize that by selectively varying the degree of stretching and thinning of different areas of a thermoplastic material the material can be selectively distributed to preferred areas of the mold cavity as desired. In order words, the present invention provides a means whereby the chilling, i.e. cooling, effect of various parts of the plug 1 on a heat softened thermoplastic sheet material may be varied from one area of the thermoplastic material to another, as desired. Such action directly influences the degree of stretching and thinning of the thermoplastic sheet material. In this way, the thickness of the wall section of a container or other item can be controlled more precisely than has heretofor been possible so that more or less of the thermoplastic sheet material may be directed, as required, to a certain area or areas of the container or article.

The materials from which inserts or plug components 4 may be manufactured can be selected from the materials discussed above with regard to plug body portion 2 with the qualification that the material selected for insert 4 must have a different, and preferably, a higher thermal conductivity than that of the material which is selected for body portion 2 of the plug 1. Examples of the materials which can be utilized include wood, felt, glass, stainless steel, aluminum, epoxy resin, nylon, polyacetyl and brass.

The precise number and shape of the plug insert(s) or component(s) 4 and the position thereof in the plug body portion 2 may be selected, as desired, to provide the desired influencing and control over the degree of stretching, thinning and distribution of various areas of the thermoplastic sheet material during formation of the container or other article.

FIG. II is a cross-section of the plug of FIG. I taken along line A—A. In this embodiment of the present invention the body portion 2 of the plug 1 is of a solid, generally frustoconical shape having a slightly concave, rounded leading face at its more narrow end. Plug insert 4 is positioned within the slightly concave, rounded leading face of body portion 2 and includes an annular area 5.

Referring now to FIG. III which is a cross-sectional view of a preferred embodiment of a plug designed in accordance with the present invention, wherein body portion 2 of the plug 1 is made of compressed felt and thus the body portion 2 of this embodiment is porous. Plug 1 is also provided with an insert 4, made of epoxy resin which is of a higher thermal conductivity than the body portion 2 of plug 1 and is bonded to the main body portion 2 by means well known in the art. Insert 4 presents an annular area 5 at the leading face or lower portion of the plug 1. FIG. III also discloses that in this embodiment the body portion 2 of plug 1 is provided with a hollow internal chamber 6 and the internally threaded metal ferrule 3 provides an inlet means 7 whereby air under pressure, for example 80 p.s.i., may be admitted to the hollow internal chamber 6 through a hollow support shaft 8. Hollow internal chamber 6 is shaped or dimensioned so that the air which is admitted under pressure into the internal hollow chamber 6 is directed toward the porous side walls of the body portion 2 of the plug 1 at area 9 which is in close proximity to the insert 4. Additionally, the side wall of the body portion 2 is designed in such a manner that it is thinnest at area 9. The directing of the air under pressure toward the thinnest portion 9 of body portion 2 results in the preferential diffusion of the air through body portion 2 at area 9. Diffusion of the pressurized air at area 9 near the leading edge of the plug 1 allows the diffused air to assist in the stretching and forming of the thermoplastic sheet.

FIG. IV discloses yet another possible embodiment of the present invention wherein body portion 2 of plug 1 is provided with a hollow internal chamber 6 and the internally threaded portion of metal ferrule 3 provides an inlet means 7 whereby air under pressure may be admitted to the internal chamber 6 through hollow support shaft 8. In this embodiment of the present invention body portion 2 of the plug is not necessarily manufactured from a porous material. Accordingly, outlet means 10 and exit vents 11 can be provided in support shaft 8 so that the pressurized air entering the internal chamber 6 may readily and easily exit therefrom. Alternatively, outlet means 10a and exit vents 11a may be provided in metal ferrule 3. Internal chamber 6 may be so dimensioned or shaped that the air that is admitted under pressure circulates in a circular fashion as demonstrated by the arrows in FIG. IV. In this embodiment the pressurized air serves the function of maintaining the high thermal conductivity of insert 4 by providing an easy and economical means for increasing the transfer of heat from insert 4.

The inventive process of the present invention may be better envisioned by those skilled in the art upon review of FIG. V which is a cross-sectional view of the actual step of thermoforming in accordance with a preferred embodiment of the present invention. In FIG. V plug 1 comprises a body portion 2 which is manufactured from a material which is porous to air or another selected forming gas. An exemplary material of this sort is compressed felt. Additionally, a means for supplying pressurized air such as, for example, a compressor (not shown) is adapted to supply pressurized air to hollow chamber 6 by way of hollow support shaft 8 and inlet means 7. Insert 4 is shaped so as to direct the pressurized air which enters hollow chamber 6 toward the thinnest portion 9 of body portion 2. Accordingly, the pressurized air entering hollow chamber 6 by way of inlet means 7 will approximately flow as indicated by the arrows-a-in FIG. V and be preferentially diffused through body portion 2 at area 9.

The plug of the present invention is to be utilized in cooperation with a forming cavity 13 of a mold 14 and in conjunction with other standard thermoforming apparatus of types already well known to those skilled in the art. With this fact in mind and in view of FIG. V, it can be seen that the presently inventive method comprises the steps of:

positioning a sheet 12 of thermoplastic material over the opening of a forming cavity 13 in a mold apparatus 14;

softening said sheet 12 by heating (via means not shown) to a temperature above the softening point of said thermoplastic material; and subjecting the softened sheet 12 to mechanical forming whereby said sheet 12 is stretched into said forming cavity 13 by insertion, as indicated by arrow-b-, of a plug 1 which comprises a body portion 2 shaped to cooperate with said cavity 13 and which has incorporated therein at least one insert 4 of a material having a thermal conductivity different from the thermal conductivity to that of body portion 2.

Preferably, the method of the present invention also includes the step of applying a differential in air pressure between the two sides of said softened sheet material simultaneously with or subsequent to said forming step. The step of applying differential air pressure preferably includes the use of forming air under pressure which has passed through plug 1 and is then applied to the softened sheet 12. If desired, a vacuum may also be applied to the softened sheet 12 through the walls of mold 14 by way of vacuum ports 15 which are connected to vacuumizing apparatus (not shown) well known to those in the art. The application of differential air pressure as described above assists in obtaining close conformance between the softened thermoplastic sheet 12 and the walls of cavity 13 of mold 14.

Those skilled in the art will appreciate that while several embodiments of the present invention have been discussed above and shown in the accompanying drawings, many modifications and/or variants to these embodiments and other embodiments are possible without departing from the broad teachings and concepts disclosed herein. By way of example only, the shape and/or disposition of the insert 4 may be varied. Additionally, additional inserts could be utilized.

We claim:

1. A method for thermoforming a thermoplastic sheet comprising the steps of:
  (a) positioning a sheet of thermoplastic material over the opening of a forming cavity;
  (b) softening said sheet by heating to a temperature above a softening point of said sheet;
  (c) mechanically forming said softened sheet by stretching through contact with a plug wherein said plug comprises a body portion having a first thermal conductivity and at least one insert having a second thermal conductivity different from said first thermal conductivity; and (d) circulating pressurized air through a central hollow inlet of the body portion, and direction said air by said insert toward and through a porous side wall of the plug and against said sheet to assist in shaping said sheet in said forming cavity;

whereby steps (c) and (d) are used to vary the degree of stretching of said sheet at different portions of said sheet.

2. The method of claim 1, further comprising a step of applying differential air pressure to said thermoplastic sheet simultaneously with said mechanical forming step.

3. The method of claim 1, further comprising a step of applying differential air pressure to said thermoplastic sheet subsequent to said mechanical forming step.

4. The method of claims 2 or 3, wherein a vacuum is applied to said sheet.

* * * * *

UNITED STATES PATENT AND TRADEMARK OFFICE
CERTIFICATE OF CORRECTION

PATENT NO. : 4,595,554

DATED : June 17, 1986

INVENTOR(S) : Lance W. Bullock, Josip Vlahek, Ferenc Kovacs

It is certified that error appears in the above-identified patent and that said Letters Patent is hereby corrected as shown below:

In column 7, line 7, delete "direction", substituting therefor --directing--

Signed and Sealed this

Nineteenth Day of August 1986

[SEAL]

Attest:

DONALD J. QUIGG

Attesting Officer

Commissioner of Patents and Trademarks